United States Patent
Muraji et al.

(10) Patent No.: US 10,189,272 B2
(45) Date of Patent: Jan. 29, 2019

(54) CORRECTION VALUE ACQUIRING METHOD FOR INKJET PRINTING APPARATUS, AND AN INKJET PRINTING APPARATUS

(71) Applicant: SCREEN HOLDINGS CO., LTD., Kyoto-shi, Kyoto (JP)

(72) Inventors: Kunio Muraji, Kyoto (JP); Seiya Nomura, Kyoto (JP); Tomoyasu Okushima, Kyoto (JP)

(73) Assignee: Screen Holdings Co., Ltd., Kyoto (JP)

( * ) Notice: Subject to any disclaimer, the term of this patent is extended or adjusted under 35 U.S.C. 154(b) by 0 days.

(21) Appl. No.: 15/898,241

(22) Filed: Feb. 16, 2018

(65) Prior Publication Data
US 2018/0281447 A1 Oct. 4, 2018

(30) Foreign Application Priority Data
Mar. 30, 2017 (JP) ................. 2017-067894

(51) Int. Cl.
*B41J 2/205* (2006.01)
*B41J 2/21* (2006.01)
*G06K 15/10* (2006.01)

(52) U.S. Cl.
CPC .......... *B41J 2/2132* (2013.01); *G06K 15/102* (2013.01)

(58) Field of Classification Search
CPC .. B41J 2/2132; B41J 2/04505; B41J 2/04506; B41J 2/04508; G06K 15/102
See application file for complete search history.

(56) References Cited

U.S. PATENT DOCUMENTS

| 6,798,906 B1* | 9/2004 | Kato .................... G06K 9/4609 345/468 |
| 9,452,603 B1* | 9/2016 | Morizono ............. B41J 2/2135 |
| 9,757,967 B2* | 9/2017 | Muraji ....................... B41J 2/01 |
| 2017/0087907 A1* | 3/2017 | Muraji ....................... B41J 2/01 |

FOREIGN PATENT DOCUMENTS

JP 2015-066852 A 4/2015

* cited by examiner

*Primary Examiner* — Huan Tran
(74) *Attorney, Agent, or Firm* — McDermott, Will & Emery LLP

(57) ABSTRACT

A correction value acquiring method for inkjet printing apparatus includes the following steps: a testing chart forming step for forming a testing chart in one printing job, the testing chart including a first line segment group having a plurality of first line segments formed by causing a drive circuit of a head module acting as reference to output a reference drive signal for obtaining a reference density, and a second line segment group having a plurality of second line segments formed by causing drive circuits of head modules other than the head module acting as reference to output the reference drive signal and drive signals with a plurality of different correction values added to the reference drive signal; an identifying step for identifying from the testing chart a second line segment having a density matching with that of a first line segment; and a correction value acquiring step for acquiring a correction value corresponding to the second line segment identified.

20 Claims, 10 Drawing Sheets

CORRECTION VALUE ACQUIRING METHOD FOR INKJET PRINTING APPARATUS, AND AN INKJET PRINTING APPARATUS

BACKGROUND OF THE INVENTION

(1) Field of the Invention

This invention relates to a correction value acquiring method for inkjet printing apparatus, and to an inkjet printing apparatus, for acquiring a correction value for use in a dispense correction of ink droplets dispensed from an inkjet head including a plurality of head modules each having a plurality of nozzles.

(2) Description of the Related Art

Conventionally, in this type of apparatus, an inkjet head includes a plurality of head modules, and each head module has a plurality of nozzles. In this apparatus, each head module has a drive circuit for driving the nozzles to dispense ink droplets. By applying voltages corresponding to print data to the drive circuits, ink droplets are dispensed from each nozzle of the inkjet head to printing paper to perform printing thereon. Such apparatus performs printing by applying the voltages corresponding to the print data to the drive circuits while outputting a reference drive voltage to the drive circuits for obtaining density to be used as reference. However, since dispense characteristics differ from head module to head module, the same voltage applied to the drive circuit of each head module can result in different head modules producing prints of different densities. So, in order to uniform the dispense characteristics between the head modules, a correcting chart is printed, and based on the printing results, correction values are acquired for correcting the driving of the drive circuits.

As a method of acquiring the correction values, the reference drive voltage is applied to a head module used as reference and the other head modules to print the correcting chart in one printing job. Subsequently, the reference drive voltage is applied to the reference head module, and the reference drive voltage to which the correction values is added is applied to the other head modules, to print a testing chart in one printing job. In this way, testing charts are printed by carrying out printing jobs corresponding in number to the required correction values. Then, a search is made for the density of the testing chart printed with the reference drive voltage by the reference head module, and for the testing charts by the other head modules and having the density equal to the density of the testing chart by the reference head module, and correction values corresponding to these testing charts are obtained (see Japanese Unexamined Patent Publication No. 2015-66852, for example).

However, the conventional examples with such constructions have the following problems.

Since the conventional apparatus corrects the reference drive voltage for each printing job to print testing charts, an increase in the number of head modules makes it necessary to carry out many printing jobs, and thus a long time is taken to acquire correction values. Further, since a plurality of print jobs are needed, an increased paper feed amount is also required for separating between printing areas for different printing jobs, thereby posing a problem of consuming a large quantity of printing paper.

SUMMARY OF THE INVENTION

This invention has been made having regard to the state of the art noted above, and its object is to provide a correction value acquiring method for inkjet printing apparatus, and an inkjet printing apparatus, which can acquire a correction value for each head module in a relatively short time, and hold down consumption of a printing medium.

To fulfill the above object, this invention provides the following construction.

A correction value acquiring method for inkjet printing apparatus, an inkjet printing apparatus with an inkjet head for dispensing ink droplets to a printing medium to form images thereon, the inkjet head including a plurality of head modules each having a plurality of nozzles for dispensing the ink droplets, and drive circuits provided for the respective head modules for driving the nozzles, the method being arranged to obtain correction values for the drive circuits, the method comprising the following steps: a testing chart forming step for forming a testing chart in one printing job, the testing chart including a first line segment group having a plurality of first line segments formed in a direction perpendicular to a transport direction of the printing medium, by causing the drive circuit of a head module acting as reference among the head modules to output a reference drive signal for obtaining a reference density, and a second line segment group having a plurality of second line segments formed in the direction perpendicular to the transport direction of the printing medium, by causing the drive circuits of the head modules other than the head module acting as reference to output the reference drive signal and drive signals with a plurality of different correction values added to the reference drive signal; an identifying step for comparing density of each first line segment and density of each second line segment based on the testing chart, and identifying a second line segment having a matching density; and a correction value acquiring step for acquiring a correction value corresponding to the second line segment identified.

According to this invention, the testing chart forming step prints the testing chart in one printing job, which chart consists of the first line segment group printed with the reference drive signal and the second line segment group printed while changing the reference drive signal. The identifying step compares the density of each first line segment and the density of each second line segment, and identifies a second line segment having a matching density. The correction value acquiring step acquires a correction value corresponding to the second line segment identified. Thus, the correction value for each head module can be acquired in a relatively short time by depicting this testing chart. Moreover, since the testing chart is printed in one printing job, a wasteful use of the printing medium can be avoided and the consumption of the printing medium can be cut down.

In this invention, it is preferred that the testing chart forming step forms the first line segment group and the second line segment group linearly in the direction perpendicular to the transport direction when the head modules constituting the inkjet head are arranged linearly in the direction perpendicular to the transport direction.

Since the first line segment group and the second line segment group on the testing chart are arranged linearly in the direction perpendicular to the transport direction, a density comparison can be made with high precision. It is therefore possible to obtain the correction values accurately.

In this invention, it is preferred that the first line segment group has the first line segments formed with gaps in between in the transport direction, and the second line segment group has the second line segments formed in alignment with the first line segments, respectively.

The plurality of first line segments and the plurality of second line segments are formed with gaps in the transport direction. The second line segments have densities varying in the transport direction, and the density variations can be recognized easily by forming gaps in between. Consequently, a second line segment matching with a first line segment can be identified with ease.

In this invention, it is preferred that the testing chart forming step forms the first line segments with gaps in between in the transport direction, and forms the second line segments in the gaps, respectively, when the head modules constituting the inkjet head are staggered in the transport direction with parts thereof overlapping each other as seen from the transport direction.

The testing chart formed has the plurality of first line segments and the plurality of second line segments with parts thereof overlapping as seen from the transport direction. It is therefore made easy to identify a second line segment matching with a first line segment in the overlapping parts as seen from the transport direction.

In another aspect of this invention, there is provided an inkjet printing apparatus with an inkjet head for dispensing ink droplets to a printing medium to form images thereon, the inkjet head including a plurality of head modules each having a plurality of nozzles for dispensing the ink droplets, and drive circuits provided for the respective head modules for driving the nozzles, the apparatus comprising a signal correction embedded data extracting device for extracting signal correction embedded data for correcting a reference drive signal for the drive circuits; a testing chart forming device for forming a testing chart in one printing job, the testing chart including a first line segment group having a plurality of first line segments formed in a direction perpendicular to a transport direction of the printing medium, by causing the drive circuit of a head module acting as reference among the head modules to output a reference drive signal for obtaining a reference density, and a second line segment group having a plurality of second line segments formed in the direction perpendicular to the transport direction of the printing medium, by causing the drive circuits of the head modules other than the head module acting as reference to output the reference drive signal and drive signals with a plurality of different correction values obtained from the signal correction embedded data and added to the reference drive signal; an identifying device for comparing density of each first line segment and density of each second line segment based on the testing chart, and identifying a second line segment having a density matching with that of a first line segment; a correction value acquiring device for acquiring a correction value corresponding to the second line segment identified; a correction value storage device for storing the correction value for each head module; and a controller, when printing on the printing medium by dispensing the ink droplets from the inkjet head based on print data, for reading the correction value corresponding to each head module from the correction value storage unit, and setting the correction value to the drive circuit corresponding to each head module to perform the printing.

According to this invention, the embedded data extracting device extracts signal correction embedded data from the print data. The testing chart forming device prints in one printing job the testing charts which consists of the first line segment group printed with the reference drive signal and the second line segment group printed while changing the reference drive signal based on the signal correction embedded data. And the identifying device identifies from the testing chart the second line segment whose density coincides with that of the first line segment. The correction value acquiring device acquires a correction value corresponding to this identified second line segment, and stores this correction value in the correction value storage unit for each head module. The controller, when printing on the printing medium based on the print data, reads the correction value corresponding to each head module from the correction value storage unit, and causes the drive circuit corresponding to each head module to carry out printing which reflects the correction value. Thus, the correction value for each head module can be acquired in a relatively short time by depicting this testing chart. Moreover, since the testing chart is printed in one printing job, a wasteful use of the printing medium can be avoided and the consumption of the printing medium can be cut down.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Embodiments will be described hereinafter taking an inkjet printing system having an inkjet printing apparatus for example.

Embodiment 1

Embodiment 1 of this invention will be described hereinafter with reference to the drawings.

Figure 1:
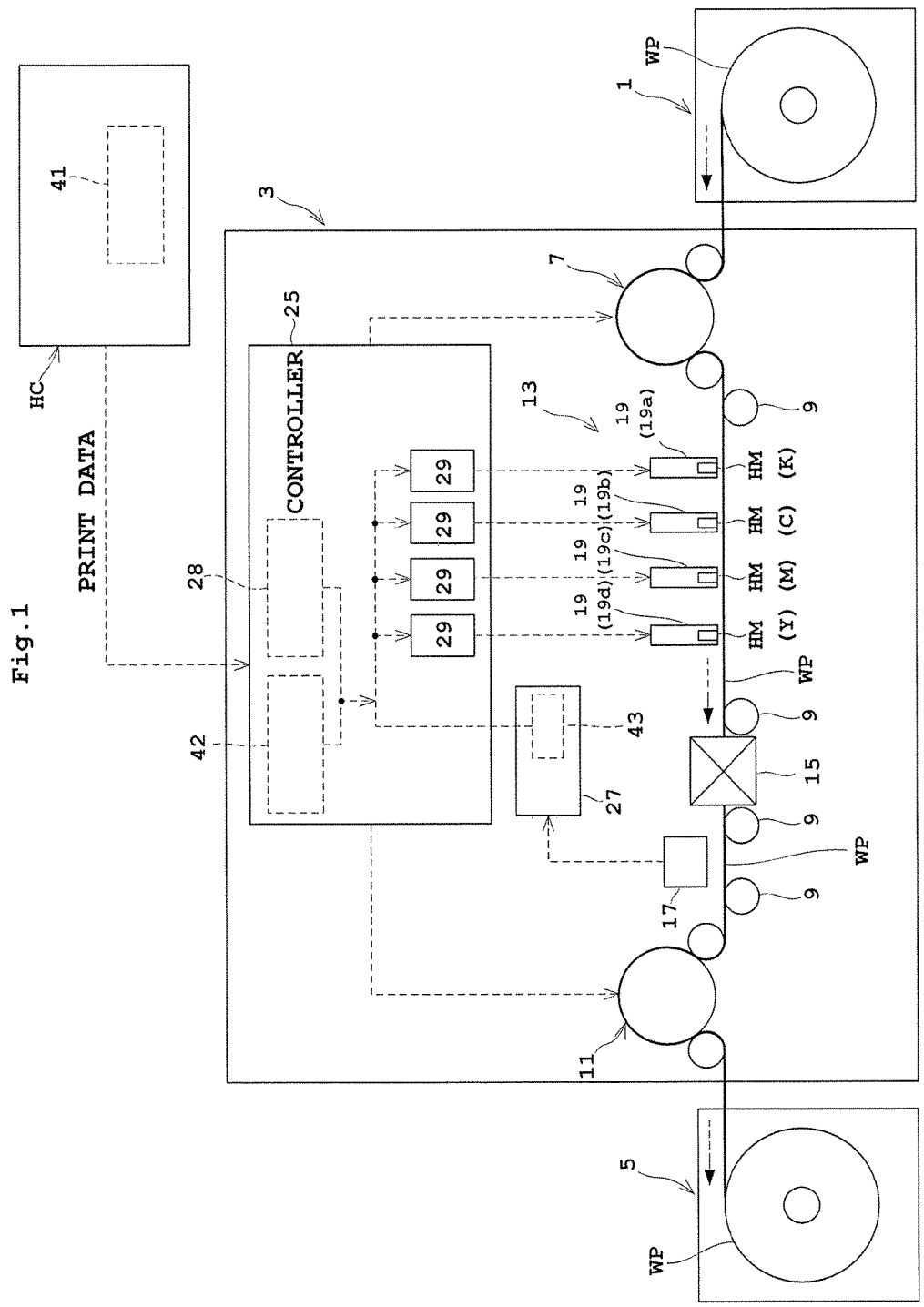
FIG. 1 is an outline schematic view showing an entire inkjet printing system according to Embodiment 1.
Figure 2:
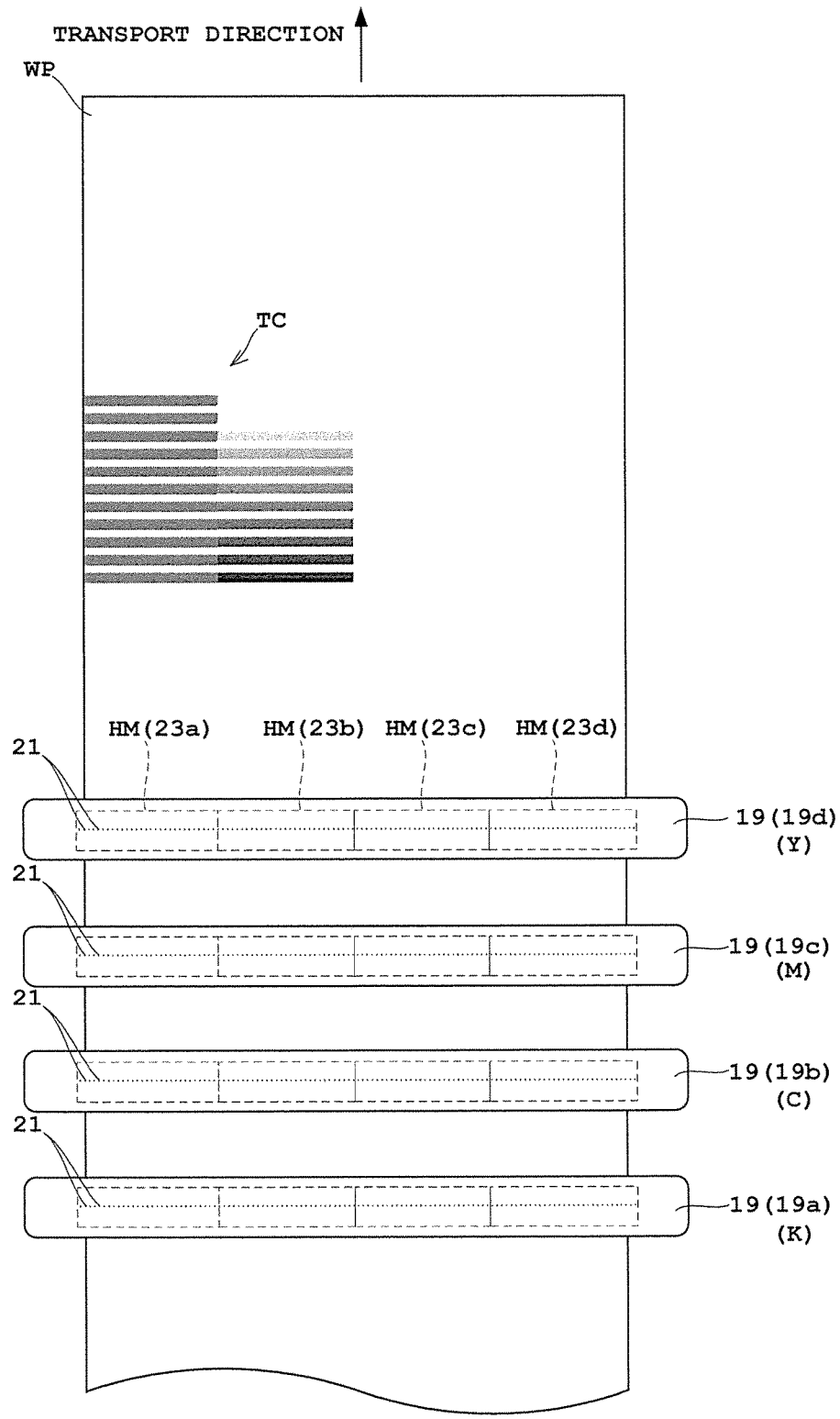
FIG. 2 is a schematic view showing a positional relationship in plan view of each print head and web paper.

FIG. 1 is an outline schematic view showing an entire inkjet printing system according to Embodiment 1. FIG. 2 is a schematic view showing a positional relationship in plan view of each print head and web paper.

The ink jet printing system according to this embodiment includes a paper feeder 1, an inkjet printing apparatus 3 and a takeup roller 5.

The paper feeder 1 holds elongate web paper WP in a roll form to be rotatable about a horizontal axis, and unwinds and feeds the web paper WP to the inkjet printing apparatus 3. The takeup roller 5 takes up on a horizontal axis the web paper WP printed in the inkjet printing apparatus 3. Referring to the side of feeding the web paper WP as upstream and that of discharging the web paper WP as downstream, the paper feeder 1 is located upstream of the inkjet printing apparatus 3, and the takeup roller 5 downstream thereof.

The inkjet printing apparatus 3 includes a drive roller 7 disposed in an upstream position for taking in the web paper WP from the paper feeder 1. The web paper WP unwound from the paper feeder 1 by the drive roller 7 is transported downstream along a plurality of transport rollers 9 toward the takeup roller 5. A drive roller 11 is disposed between the most downstream transport roller 9 and the takeup roller 5. This drive roller 11 feeds the web paper WP transported on the transport rollers 9 forward toward the takeup roller 5.

The above web paper WP corresponds to the "printing medium" in this invention.

The inkjet printing apparatus 3 has a printing unit 13, a dryer 15 and a scanner 17 arranged in the stated order from upstream between the drive roller 7 and drive roller 11. The dryer 15 dries portions printed by the printing unit 13. The scanner 17 checks whether the printed portions have stains, omissions or other defects, and scans testing charts, which will be described hereinafter, to acquire testing image data.

The printing unit 13 has a plurality of print heads 19 for dispensing ink droplets. This embodiment will be described taking a construction having four print heads 19 for example. Here, the print heads 19 will be labeled print head 19a, print head 19b, print head 19c and print head 19d in order from upstream.

In this specification, when the print heads 19 need to be distinguished, an alphabet sign (such as "a") will be written after each numeral sign 19, but when it is not necessary to distinguish them, only sign 19 will be used. Each print head 19 includes a plurality of head modules HM arranged linearly in a direction perpendicular to a transport direction. Here, each print head 19 includes four head modules HM, for example. Each head module HM has a plurality of nozzles 21 for dispensing ink droplets. The plurality of nozzles 21 of each head module HM are arranged to form a line in the direction perpendicular to the transport direction of the web paper WP, and these nozzles 21 constitute each integral head module HM. Here, when the four head modules HM need to be individually identified, they will be called head modules 23a, 23b, 23c and 23d in order from left to right in plan view.

The above print heads 19a-19d are provided to dispense ink droplets in at least two colors, to be capable of making multicolor printing on the web paper WP. Here, for example, the print head 19a dispenses black (K) ink, the print head 19b dispenses cyan (C) ink, the print head 19c dispenses magenta (M) ink, and the print head 19d dispenses yellow (Y) ink. The print heads 19a-19d are arranged at predetermined intervals in the transport direction.

The above print heads 19 correspond to the "inkjet head" in this invention.

The inkjet printing apparatus 3 includes a controller 25 and an image processor 27.

The controller 25 and image processor 27 are constructed of a CPU, memory and so on not shown. The controller 25 receives print data and controls production of prints. The print data includes print data for making prints such as products, and testing chart data for printing a testing chart TC described hereinafter. The controller 25 includes an embedded data extractor 28, and head controllers 29 for the respective head modules HM of the print heads 19a-19d. In the following description, the print head 19a will be described by way of example, with its reference sign written just 19, and not 19a.

The embedded data extractor 28, when the testing chart TC described hereinafter is included in the print data, extracts signal correction embedded data set thereto. The signal correction embedded data consists of varied correction values for correcting a reference drive signal. The correction values of the testing chart TC are arranged in a predetermined location such as an end of the print data, for example. Thus, when the print data includes the testing chart TC, the embedded data extractor 28 extracts signal correction embedded data from that location, extracts all the correction values for correcting the reference drive signal to be obtained henceforth, and adjusts the reference drive signal when the testing chart TC described hereinafter is depicted. The print data from which the signal correction embedded data has been extracted by the embedded data extractor 28 is given to the head controllers 29. When the print data does not include the testing chart TC, the embedded data extractor 28 does not extract the signal correction embedded data, but sends the print data as it is to the head controllers 29.

The above embedded data extractor 28 corresponds to the "signal correction embedded data extracting device" in this invention.

Figure 3:
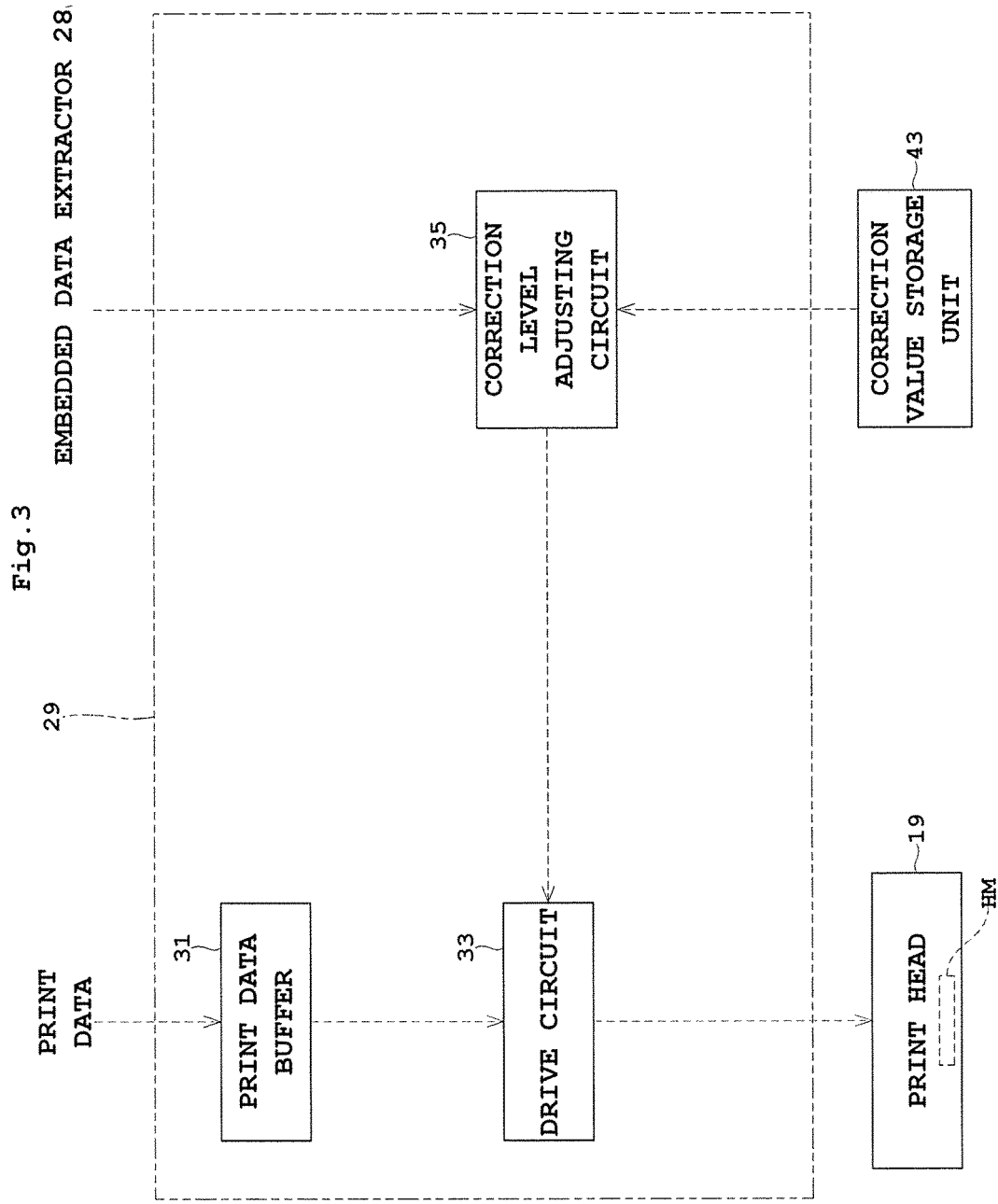
FIG. 3 is a block diagram of a head controller.

Reference will now be made to FIG. 3. FIG. 3 is a block diagram of a head controller.

Each head controller 29 includes a print data buffer 31, a drive circuit 33, and a correction level adjusting circuit 35.

The print data buffer 31 receives print data and temporarily stores only a fixed quantity of data. What is stored temporarily is, of the print data, data for at least one line to be printed by the print head 19. The host computer HC includes a testing chart storage unit 41 for storing print data of the testing chart TC. Preferably, the testing chart TC is also stored in an internal chart storage unit 42 of the controller 25, so that the testing chart TC can be printed solely by the inkjet printing apparatus 3, without receiving the data from the host computer HC.

The drive circuit 33 causes ink droplets to be dispensed from the plurality of nozzles 21 of the head module HM. The drive circuit 33 receives from the print data buffer 31 print data of a part corresponding to the position of the head module HM of the print data for one line, and gives a drive signal (e.g. drive voltage) corresponding to the print data to the head module HM of the print head 19. The correction level adjusting circuit 35 gives the reference drive signal to the drive circuit 33. Based on this reference drive signal, the drive circuit 33 drives the head module HM with a drive signal corresponding to the print data. The reference drive signal is a signal for making the density of an image formed by inking from the head module HM equal to a predetermined reference density. However, since dispense characteristics of the nozzles 21 differ from one head module HM to another, when printing is done by giving image data of the same density to two head modules HM, the two different head modules HM do not necessarily produce printed images with the same density. In response to instructions from the controller 25, therefore, the correcting level adjusting circuit 35 adjusts the reference drive signal according to correction values set as described hereinafter, and gives the adjusted signals to the drive circuit 33. When printing the testing chart TC, the correcting level adjusting circuit 35 receives correction values from the embedded data extractor 28, adjusts the reference drive signal to reflect the correction values, and gives the adjusted signals to the drive circuit 33.

The image processor 27 collects testing image data produced from the scanner 17 scanning the testing chart TC, and acquires a correction value, described hereinafter, for each head module HM by carrying out image processing of the testing image data. The acquired correction value is stored in a correction value storage unit 43 of the head module HM corresponding to the correction value.

Figure 4:
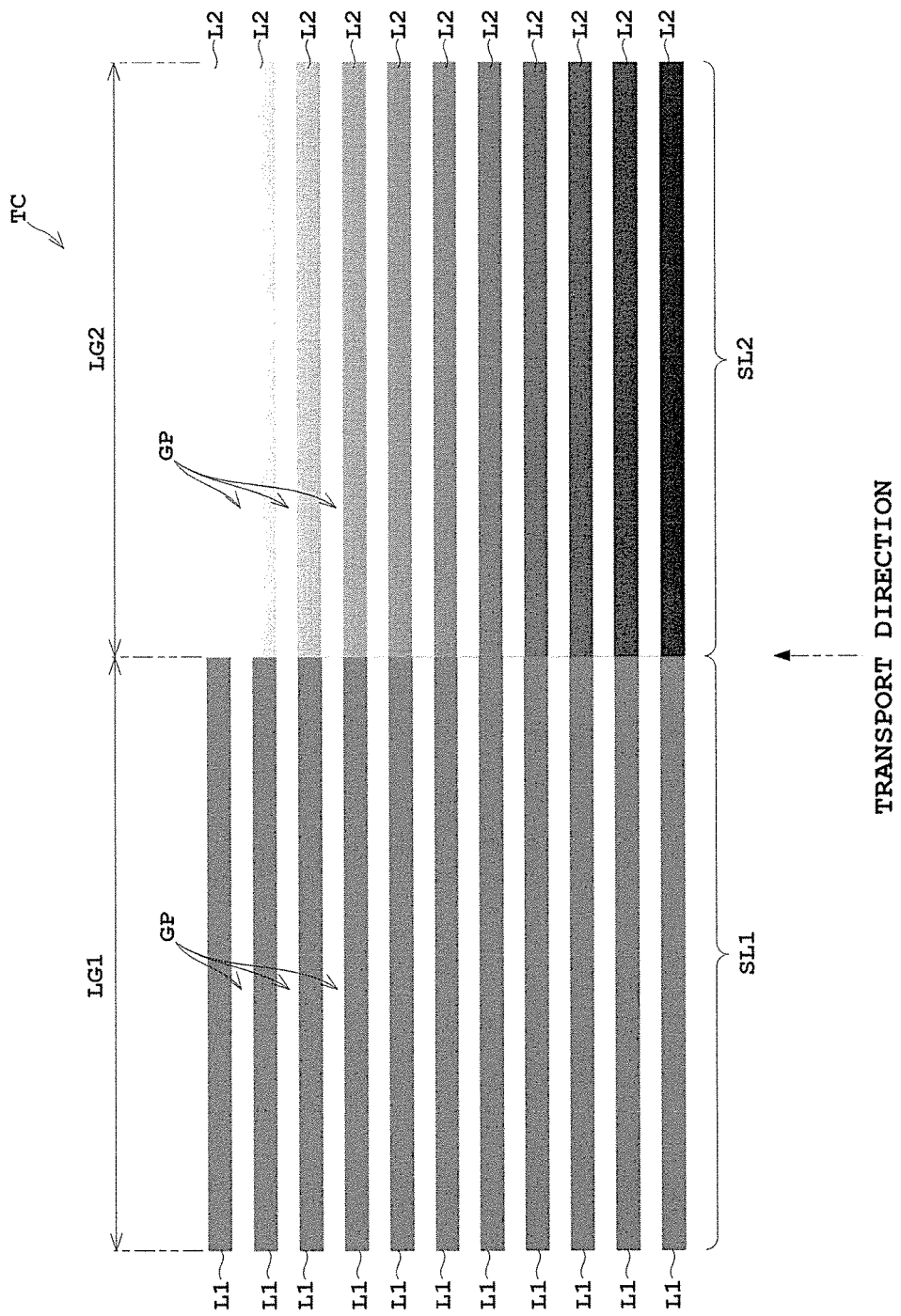
FIG. 4 is a schematic view showing an example of testing charts.

Next, reference is made to FIG. 4. FIG. 4 is a schematic view showing an example of testing charts.

The testing chart TC includes a first line segment group SL1 consisting of a plurality of first line segments L1 formed by a head module HM used as reference, and a second line segment group SL2 consisting of a plurality of second line segments L2 formed following the first line segments L1 by a non-reference head module HM. This testing chart TC is formed by the two head modules HM, but usually it is formed by combinations of the head modules HM constituting one print head 19.

The head module HM used as reference is a head module HM located leftward in plan view, for example. The non-reference head module HM is a head module HM next to the right of the reference head module HM in plan view, for example. Specifically, the head module 23a acts as reference, and the head module 23b is the non-reference one.

The first line segment group SL1 includes a plurality of (e.g. eleven) first line segments L1 having a long axis of length LG1 in the direction perpendicular to the transport direction and a predetermined width in the transport direction. A gap GP is formed between each adjacent pair of first line segments L1. This gap GP has no image formed therein, but exposes the web paper WP per se. The first line segments L1 are formed by all the nozzles 21 of the reference head module HM arranged in the width direction (direction perpendicular to the transport direction) of the web paper WP. The first line segments L1 do not necessarily need to be formed by all the nozzles 21, but may be formed by the number of nozzles close to the total number of nozzles 21.

The second line segments L2 have density varying in the transport direction, and gaps GP formed in between facilitate recognition of the density variations. This makes it easy to identify the second line segments L2 matching the first line segments L1. However, this is not essential and printing may be made without forming the gaps GP.

When forming the first line segment group SL1, the correction level adjusting circuit 35 gives the reference drive signal to the drive circuit 33. This reference drive signal is a signal for causing the density of an image formed by inking from the head module HM of the print head 19 to agree with the predetermined reference density. The term all the nozzles 21 mentioned above refers to the plurality of nozzles 21 that contribute to printing on the web paper WP. This term therefore does not include nozzles 21 existing in positions outside the width of the web paper WP or outside a print area thereof.

The second line segment group SL2 has a plurality of (e.g. eleven) second line segments L2 formed in alignment with the first line segments L1 constituting the first line segment group SL1. These second line segments L2 have a long axis of length LG2 in the direction perpendicular to the transport direction. Since the second line segments L2 are arranged in alignment with the first line segments L1, gaps GP are formed between the second line segments L2.

Each second line segment L2 is formed with the correction values given from the embedded data extractor 28 to the correction level adjusting circuit 35. As the values, the middle part in the testing chart TC seen in the transport direction is 0, for example, and the absolute value is increased with the distance in the transport direction away from the 0 in the middle. When eleven second line segments L2 are provided, for example, the signal is incremented by 1 (V) on a line-by-line basis from the 0 in the middle. Specifically, the correction values are changed to be −5 (V), −4 (V), −3 (V), −2 (V), −1 (V), 0 (V), +1 (V), +2 (V), +3 (V), +4 (V) and +5 (V). As a result, as shown in FIG. 4, each second line segment L2 in the second line segment group SL2 differs in density from the others along the transport direction.

The testing chart TC noted above is printed on the web paper WP by the head modules HM of the print head 19 under control of the controller 25. Then, the printed testing chart TC is scanned by the scanner 17. Next, the testing chart TC is digitized to be testing image data, which is given to the image processor 27. Of the testing image data, the image processor 27 compares the density of each first line segment L1 and that is of each second line segment L2 on the testing chart TC in the direction perpendicular to the transport direction. And the second line segment L2 closest in density to the first line segment L1 is identified. Based on the signal correction embedded data (various correction values) stored in the embedded data extractor 28, a correction value corresponding to the identified second line segment L2 is acquired. The correction value acquired in this way is stored in the correction value storage unit 43 corresponding to the head module HM (23b).

The controller 25 causes the above testing chart TC to be printed as one printing job. After the one printing job, the controller 25 causes the web paper WP to be transported a feed amount of predetermined length, and executes a next one printing job. That is, a gap is formed between the printing jobs to have at least a predetermined distance in the transport direction of the web paper WP.

When making prints, the controller 25 reads from the correction value storage unit 43 the correction value corresponding to each head module HM, and sets it to the correction value level adjusting circuit 35. The reference drive signal reflecting the correction value is given to the drive circuit 33, and printing is carried out by the print head 19.

The above testing chart TC is formed only by the head module 23a and head module 23b. It is preferred, however, to form further testing charts TC by the head module 23c with the head module 23b acting as reference, and by the head module 23d with the head module 23c acting as reference. With the testing charts TC created by successively switching the reference head modules HM in this way, the image processor 27, using any one of all the head modules HM constituting one print head 19, can calculate correction values for the non-reference head modules HM. The correction values for correcting the reference drive signal can therefore be calculated in order to equalize density for all the head modules HM constituting the print head 19.

The above print head 19 and controller 25 correspond to the "testing chart forming device" in this invention. The image processor 27 corresponds to the "identifying device" and "correction value acquiring device" in this invention.

Figure 5:
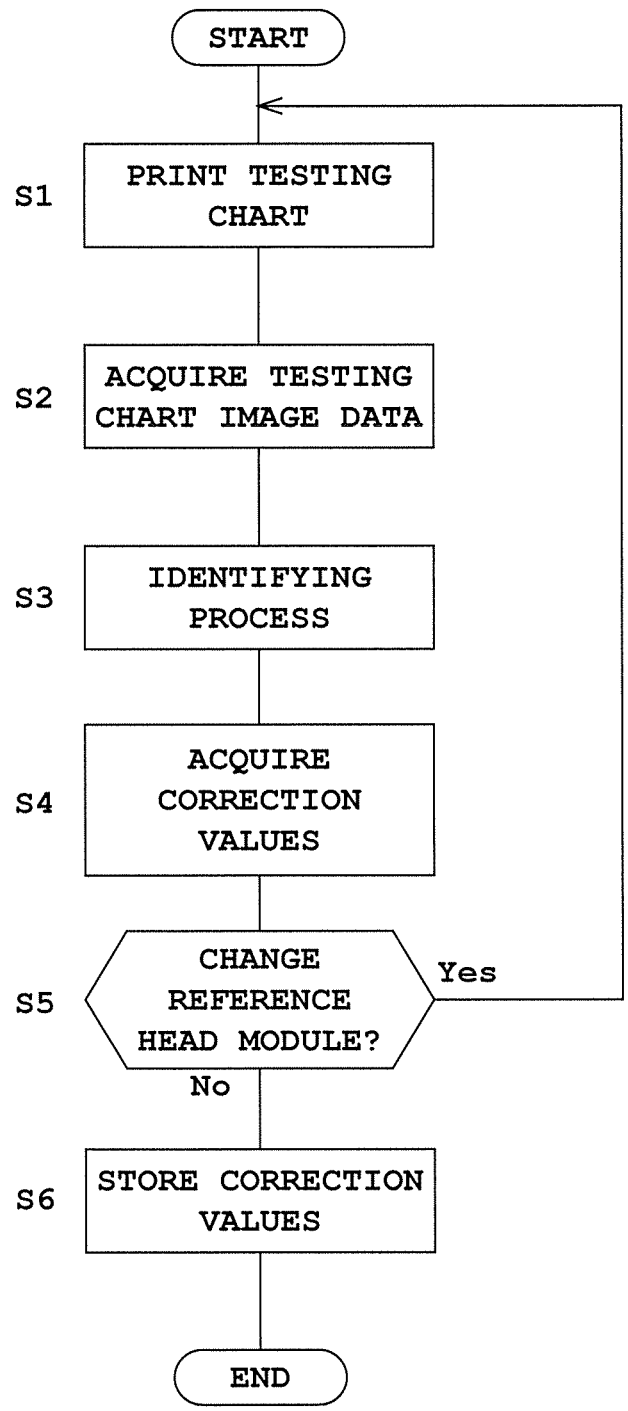
FIG. 5 is a flow chart showing a correction value acquiring process.
Figure 6:
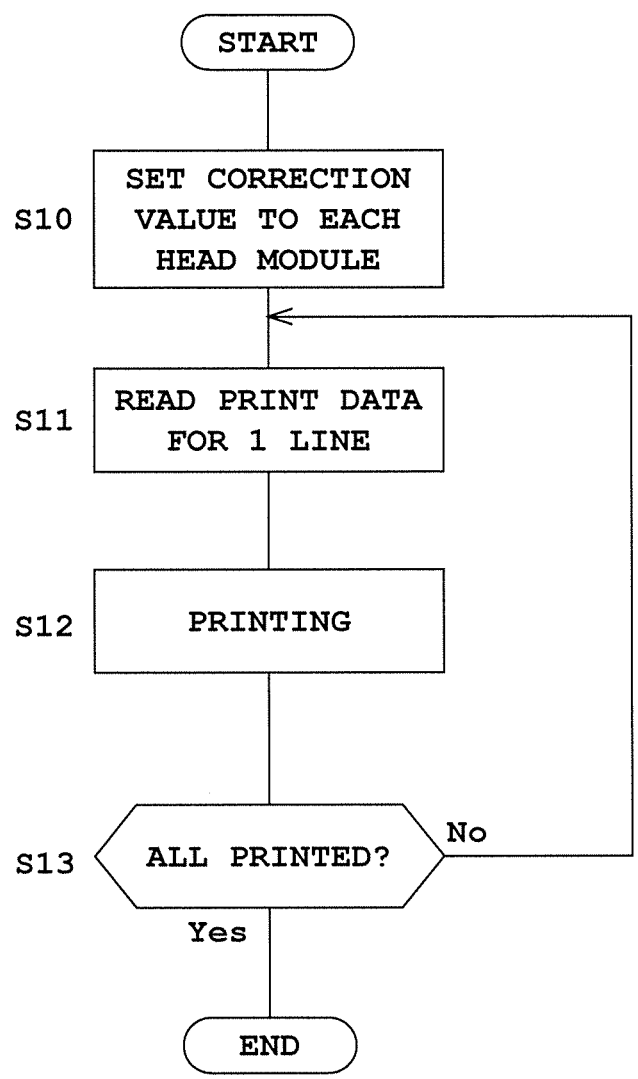
FIG. 6 is a flow chart showing a printing process.

Next, an operation for a correction value acquiring process and a printing process based on acquired correction values will be described with reference to FIGS. 5 and 6. FIG. 5 is a flow chart showing the correction value acquiring process. FIG. 6 is a flow chart showing the printing process.

<Correction Value Acquiring Process>

Step S1

The controller 25 reads data of the testing chart TC from the testing chart storage unit 41 of the host computer HC or from the internal chart storage unit 42, and causes the print head 19 to print the testing chart TC. It is preferable to form a testing chart TC for each print head 19 and to print four testing charts TC.

Step S2

The image processor 27 operates the scanner 17 to scan the printed testing chart TC, and acquires testing image data digitized from the testing chart TC.

Step S3

The image processor 27 searches the testing image data for a location where the first line segment L1 and second line segment L2 agree in density, and identifies the second line segment L2 in such location.

Step S4

The image processor 27, based on the testing chart TC, acquires the correction values for the second line segments L2.

Step S5

When there are a plurality of head modules HM, the controller 25 changes the head modules HM used as reference, and returns to step S1 to print the testing charts TC. The operation moves to step S6 after printing testing charts TC for the number of head modules HM used as reference (i.e. all the head modules HM minus one).

Step S6

The image processor 27 stores the correction values determined as above in the correction value storage unit 43 as corresponding to the respective head modules HM.

The correction value acquiring process is completed by the above series of steps.

Next, the printing using the correction values acquired through the above process will be described.

<Printing Process>

Step S10

The controller 25 reads the correction value corresponding to each head module HM from the correction value storage unit 43. The correction value is reflected in the drive circuit 33 through the correction level adjusting circuit 35 of the corresponding head module HM.

Step S11

The controller 25 receives print data for making prints from the host computer HC. At this time, the embedded data extractor 28 outputs the print data as it is, without an extracting process, to each head controller 29. The print data buffer 31 of each head controller 29 reads print data for one line to be printed by the print head 19 at a time.

Step S12

The print head 19 is driven to print one line according to the print data by the drive signal reflecting the correction value for each head module HM.

Step S13

The controller 25 branches the process based on whether or not printing has been completed for all the lines based on the print data. When not completed, the operation returns to step S11 to read and print data for a next one line. When completed, the process is ended.

According to this Embodiment 1, when the testing chart TC is included in the print data, the embedded data extractor 28 extracts signal correction embedded data from the print data. The testing chart TC is printed in one printing job, which testing data TC consists of the first line segment group SL1 printed by a print head 19 with the reference drive signal and the second line segment group SL2 printed while changing the reference drive signal based on the signal correction embedded data. And the image processor 27 determines from the testing chart TC the second line segment L2 whose density coincides with that of the first line segment L1. The image processor 27 acquires a correction value corresponding to this identified second line segment L2, and stores this correction value in the correction value storage unit 43 for each head module HM. The controller 25, when printing on the web paper WP based on the print data, reads the correction value corresponding to each head module HM from the correction value storage unit 43, and causes the drive circuit 33 corresponding to each head module HM to carry out printing which reflects the correction value. Thus, the correction value for each head module HM can be acquired in a relatively short time by depicting this testing chart TC. Moreover, since the testing chart TC is printed in one printing job, a wasteful use of web paper WP can be avoided and the consumption of web paper WP can be cut down.

Embodiment 2

Embodiment 2 of this invention will be described hereinafter with reference to the drawings.

Figure 7:
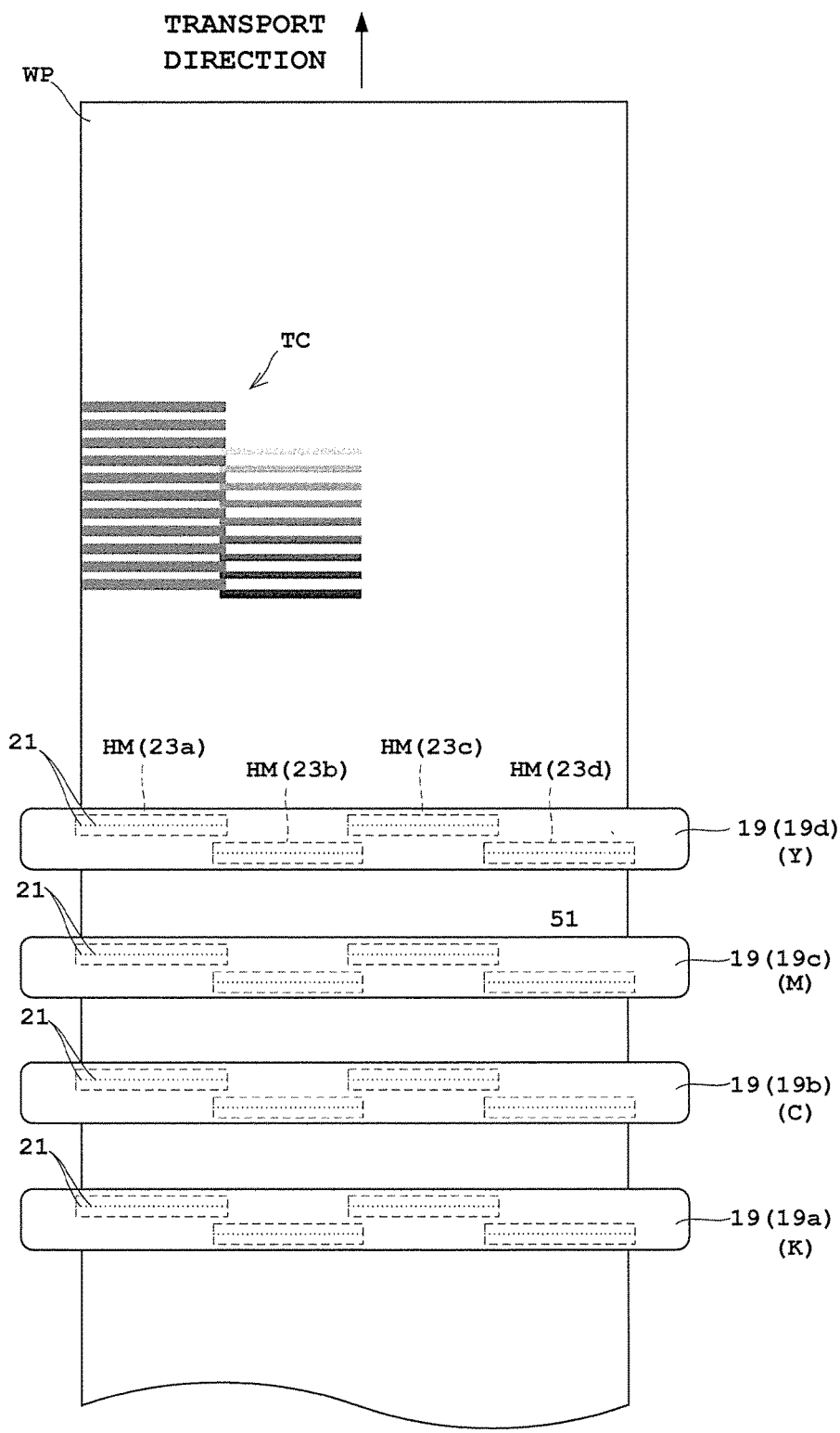
FIG. 7 is a schematic view showing a positional relationship in plan view of each print head and web paper in an inkjet printing system according to Embodiment 2.

FIG. 7 is a schematic view showing a positional relationship in plan view of each print head and web paper in an inkjet printing system according to Embodiment 2.

Figure 8:
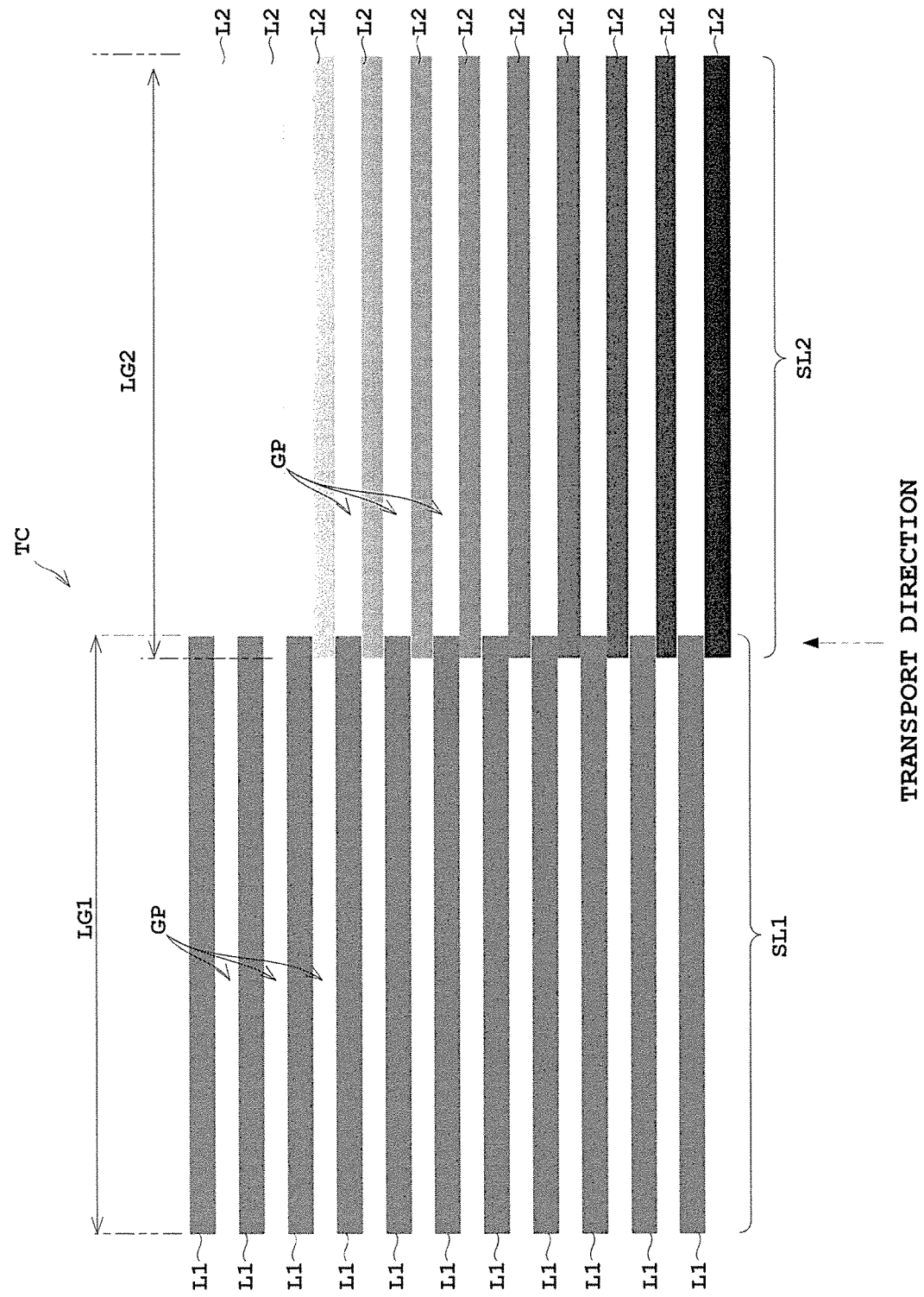
FIG. 8 is a schematic view showing a testing chart according to Embodiment 2.

Embodiment 1 has been described taking for example the apparatus with each print head 19 having four head modules HR arranged linearly in the direction perpendicular to the transport direction. Embodiment 2 is different in construction in that, as shown in FIG. 7, the four head modules HR constituting each print head 19 are arranged out of alignment in the transport direction, and partly overlapping each other as seen from the transport direction.

Where the print head 19 is constructed as described above, it is preferable to acquire correction values using a testing chart TC as shown in FIG. 8. FIG. 8 is a schematic view showing the testing chart according to Embodiment 2.

First, in this example, as in foregoing Embodiment 1, a reference head module HM is determined from among the four head modules HM, and the testing chart TC is printed.

This testing chart TC includes a first line segment group SL1 consisting of eleven first line segments L1 printed by the reference head module HM and arranged with gaps GP in between as in foregoing Embodiment 1, and a second line segment group SL2 consisting of second line segments L2 printed by the head module HM adjacent the reference head module HM and formed in the gaps GP between the first line segments L1. The length LG1 of the first line segments L1 by the reference head module HM and the second line segments L2 by the adjacent head module HM overlap each other as seen from the transport direction, by a length corresponding to parts of the head modules HM overlap each other.

With the testing chart TC made up in this way, the second line segment L2 can easily be identified as having the overlapping part as seen from the transport direction, which part coincides in density with the first line segment L1.

The testing chart TC made up as described above and printed on the web paper WP is scanned and digitized into testing image data by the scanner 17. Of the testing image data, the image processor 27 compares the density of each first line segment L1 and that of each second line segment L2 on the testing chart TC in respect of the overlapping parts and in the transport direction. And the second line segment L2 with the density closest to that of the first line segment L1 is identified, and the correction value corresponding to the identified second line segment L2 is acquired. The correction value acquired in this way is stored in the correction value storage unit 43 as matched with each head module HM.

Figure 9:
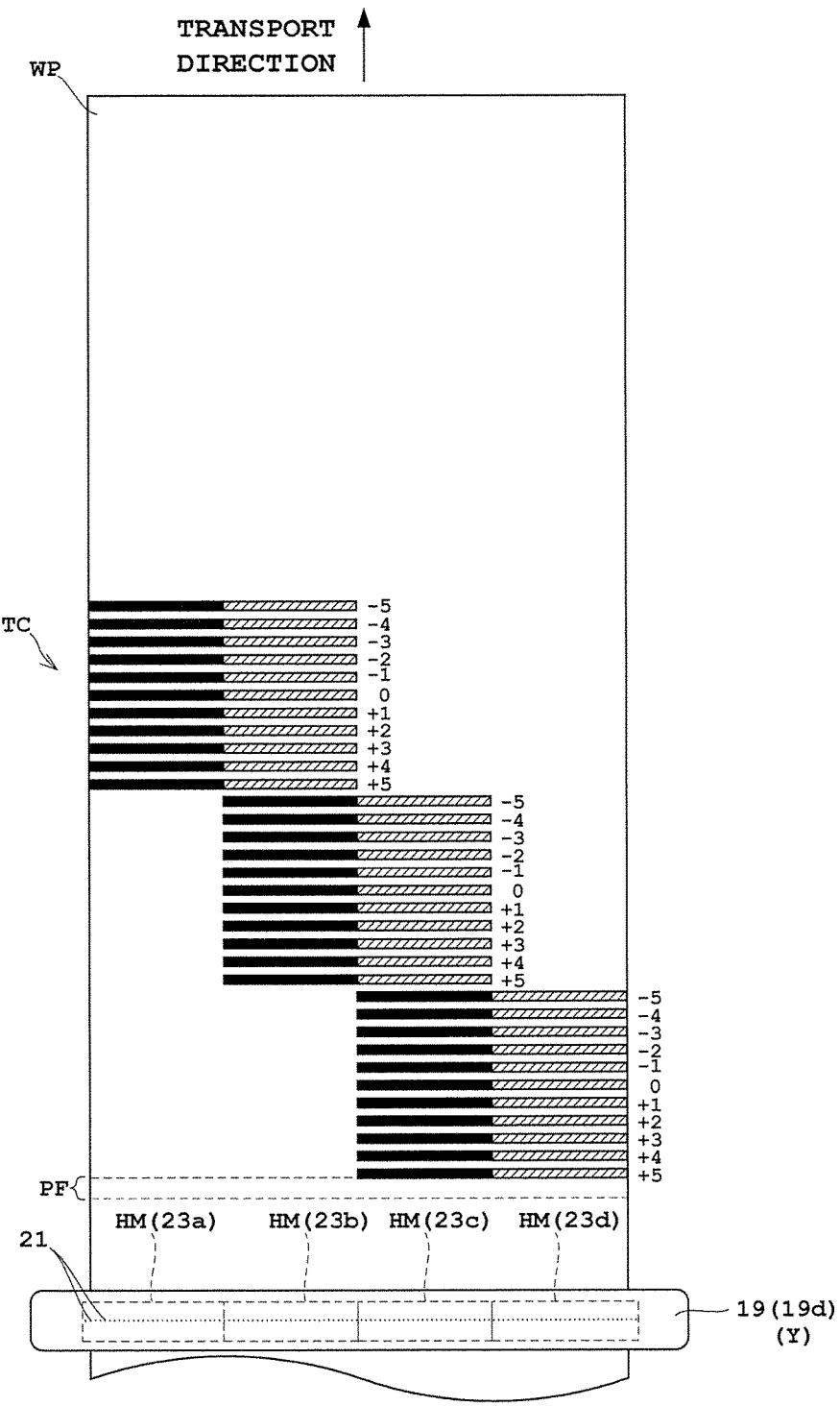
FIG. 9 is a schematic view showing an entire testing chart according to Embodiment 1.
Figure 10:
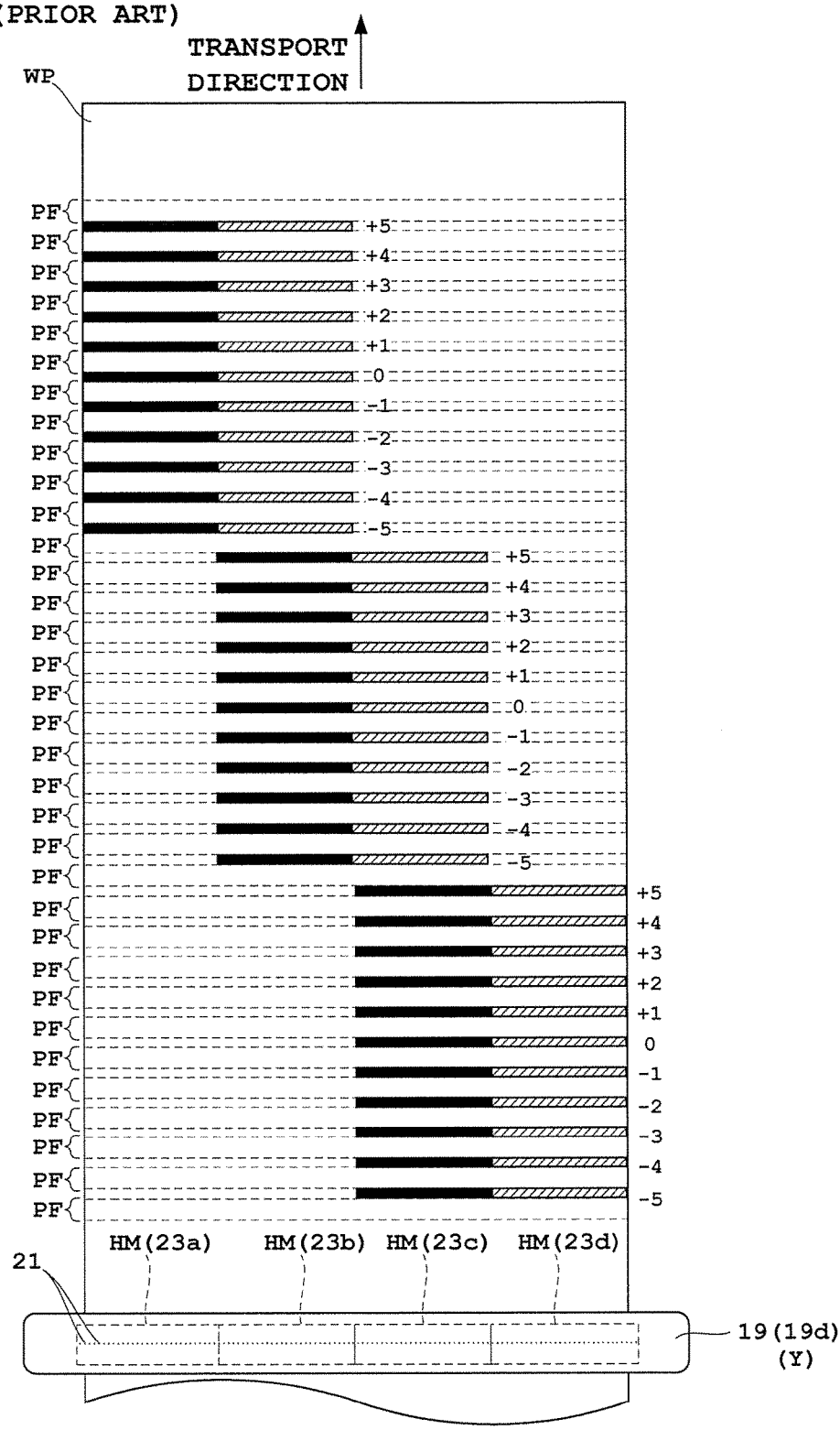
FIG. 10 is a schematic view showing an entire testing chart according to a conventional example.

Next, with reference to FIGS. 9 and 10, a comparison is made between a printed example of testing chart in Embodiment 1 and a conventional printed example of testing chart. FIG. 9 is a schematic view showing an entire testing chart in Embodiment 1. FIG. 10 is a schematic view showing an entire testing chart in the conventional example.

As shown in FIG. 9, Embodiment 1 prints a testing chart TC with a reference drive voltage reflecting varied correction values while using as reference a head module HM which is one subtracted from the number of head modules HM in one print head 19. Since these can be printed in one printing job, a feed amount PF for separating print areas occurs once, at the start or finish.

On the other hand, as shown in FIG. 10, the conventional example is the same as the above Embodiment 1 in printing a testing chart TC with a reference drive voltage reflecting varied correction values while using as reference a head module HM which is one subtracted from the number of head modules HM in one print head 19. However, since the reference drive voltage cannot be adjusted within one printing job, one printing job is finished each time a second line segment L2 is drawn by the reference drive voltage corrected with one correction value. It will therefore become necessary to insert a separating feed amount PF each time one pair of first line segment L1 and second line segment L2 are drawn. Thus, it will be appreciated that when the testing chart is printed while using as reference a head module HM which is one subtracted from the number of head modules HM in one print head 19, there arise problems that the printing takes time and needs a greatly increased amount of web paper WP, compared with Embodiment 1.

This invention is not limited to the foregoing embodiments, but can be modified as follows:

(1) In each foregoing embodiment, the number of first line segments L1 is eleven by way of example. This invention is not limited to such a number. The number of these line segments may be determined according to amounts of shift of the drive signal from the reference drive signal.

(2) In each foregoing embodiment, the printing medium is exemplified by web paper WP. This invention is applicable to other printing media such as film.

(3) In each foregoing embodiment, the inkjet printing apparatus 3 with four print heads 19 has been described by way of example. This invention is not limited to such construction. For example, this invention is applicable as long as at least one print head 19 is provided.

(4) In each foregoing embodiment, the inkjet printing apparatus 3 with each print head 19 having four head modules HM has been described by way of example. This invention is not limited to such construction. For example, this invention is applicable as long as at least two head modules HM are provided.

(5) In each foregoing embodiment, the scanner 17 scans the testing charts TC and locations where the first line segments L1 and second line segments L2 agree in density are determined based on the testing image data. However, the determination may be made with human eyes without scanning the testing charts TC. In that case, for example, correction values may be inputted from a GUI (graphic user interface).

(6) In each foregoing embodiment, the other head module HM (for drawing the second line segments L2) than the head module HM used as reference (for drawing the first line segments L1) is a head module HM adjacent the reference head module HM. However, since the image processor 27 compares density after scanning by the scanner 17, it is not absolutely necessary for this invention to select the non-reference head module HM adjacent the reference head module HM. The non-reference head module HM may be one distant from the reference head module HM.

This invention may be embodied in other specific forms without departing from the spirit or essential attributes thereof and, accordingly, reference should be made to the appended claims, rather than to the foregoing specification, as indicating the scope of the invention.

What is claimed is:

1. A correction value acquiring method for inkjet printing apparatus, an inkjet printing apparatus with an inkjet head for dispensing ink droplets to a printing medium to form images thereon, the inkjet head including a plurality of head modules each having a plurality of nozzles for dispensing the ink droplets, and drive circuits provided for the respective head modules for driving the nozzles, the method being arranged to obtain correction values for the drive circuits, the method comprising the following steps:

a testing chart forming step for forming a testing chart in one printing job, the testing chart including a first line segment group having a plurality of first line segments formed in a direction perpendicular to a transport direction of the printing medium, by causing the drive circuit of a head module acting as reference among the head modules to output a reference drive signal for obtaining a reference density, and a second line segment group having a plurality of second line segments formed in the direction perpendicular to the transport direction of the printing medium, by causing the drive circuits of the head modules other than the head module acting as reference to output the reference drive signal and drive signals with a plurality of different correction values added to the reference drive signal;

an identifying step for comparing density of each first line segment and density of each second line segment based on the testing chart, and identifying a second line segment having a matching density; and a correction value acquiring step for acquiring a correction value corresponding to the second line segment identified.

2. The correction value acquiring method for inkjet printing apparatus according to claim 1, wherein the testing chart forming step forms the first line segment group and the second line segment group linearly in the direction perpendicular to the transport direction when the head modules constituting the inkjet head are arranged linearly in the direction perpendicular to the transport direction.

3. The correction value acquiring method for inkjet printing apparatus according to claim 2, wherein the first line segment group has the first line segments formed with gaps in between in the transport direction, and the second line segment group has the second line segments formed in alignment with the first line segments, respectively.

4. The correction value acquiring method for inkjet printing apparatus according to claim 1, wherein the testing chart forming step forms the first line segments with gaps in between in the transport direction, and forms the second line segments in the gaps, respectively, when the head modules constituting the inkjet head are staggered in the transport direction with parts thereof overlapping each other as seen from the transport direction.

5. The correction value acquiring method for inkjet printing apparatus according to claim 1, wherein the identifying step is executed based on testing image data obtained by scanning the testing chart.

6. The correction value acquiring method for inkjet printing apparatus according to claim 2, wherein the identifying step is executed based on testing image data obtained by scanning the testing chart.

7. The correction value acquiring method for inkjet printing apparatus according to claim 3, wherein the identifying step is executed based on testing image data obtained by scanning the testing chart.

8. The correction value acquiring method for inkjet printing apparatus according to claim 4, wherein the identifying step is executed based on testing image data obtained by scanning the testing chart.

9. The correction value acquiring method for inkjet printing apparatus according to claim 1, wherein the number of first line segments is determined according to amounts of shift of the drive signals from the reference drive signal.

10. The correction value acquiring method for inkjet printing apparatus according to claim 2, wherein the number of first line segments is determined according to amounts of shift of the drive signals from the reference drive signal.

11. The correction value acquiring method for inkjet printing apparatus according to claim 3, wherein the number of first line segments is determined according to amounts of shift of the drive signal from the reference drive signal.

12. The correction value acquiring method for inkjet printing apparatus according to claim 4, wherein the number of first line segments is determined according to amounts of shift of the drive signals from the reference drive signal.

13. The correction value acquiring method for inkjet printing apparatus according to claim 5, wherein the number of first line segments is determined according to amounts of shift of the drive signals from the reference drive signal.

14. The correction value acquiring method for inkjet printing apparatus according to claim 6, wherein the number of first line segments is determined according to amounts of shift of the drive signals from the reference drive signal.

15. The correction value acquiring method for inkjet printing apparatus according to claim 7, wherein the number of first line segments is determined according to amounts of shift of the drive signals from the reference drive signal.

16. The correction value acquiring method for inkjet printing apparatus according to claim 8, wherein the number of first line segments is determined according to amounts of shift of the drive signals from the reference drive signal.

17. An inkjet printing apparatus with an inkjet head for dispensing ink droplets to a printing medium to form images thereon, the inkjet head including a plurality of head modules each having a plurality of nozzles for dispensing the ink droplets, and drive circuits provided for the respective head modules for driving the nozzles, the apparatus comprising:
- a signal correction embedded data extracting device for extracting signal correction embedded data for correcting a reference drive signal for the drive circuits;
- a testing chart forming device for forming a testing chart in one printing job, the testing chart including a first line segment group having a plurality of first line segments formed in a direction perpendicular to a transport direction of the printing medium, by causing the drive circuit of a head module acting as reference among the head modules to output a reference drive signal for obtaining a reference density, and a second line segment group having a plurality of second line segments formed in the direction perpendicular to the transport direction of the printing medium, by causing the drive circuits of the head modules other than the head module acting as reference to output the reference drive signal and drive signals with a plurality of different correction values obtained from the signal correction embedded data and added to the reference drive signal;
- an identifying device for comparing density of each first line segment and density of each second line segment based on the testing chart, and identifying a second line segment having a density matching with that of a first line segment;
- a correction value acquiring device for acquiring a correction value corresponding to the second line segment identified;
- a correction value storage device for storing the correction value for each head module; and
- a controller, when printing on the printing medium by dispensing the ink droplets from the inkjet head based on print data, for reading the correction value corresponding to each head module from the correction value storage unit, and setting the correction value to the drive circuit corresponding to each head module to perform the printing.

18. The inkjet printing apparatus according to claim 17, wherein the testing chart forming device forms the first line segment group and the second line segment group linearly in the direction perpendicular to the transport direction when the head modules constituting the inkjet head are arranged linearly in the direction perpendicular to the transport direction.

19. The inkjet printing apparatus according to claim 18, wherein the first line segment group has the first line segments formed with gaps in between in the transport direction, and the second line segment group has the second line segments formed in alignment with the first line segments, respectively.

20. The inkjet printing apparatus according to claim 17, wherein the testing chart forming device forms the first line segments with gaps in between in the transport direction, and forms the second line segments in the gaps, respectively, when the head modules constituting the inkjet head are staggered in the transport direction with parts thereof overlapping each other as seen from the transport direction.

* * * * *